(12) United States Patent
Inoue et al.

(10) Patent No.: US 7,273,126 B2
(45) Date of Patent: Sep. 25, 2007

(54) TRAVELING VEHICLE

(75) Inventors: Yuji Inoue, Okayama (JP); Kenshirou Kanou, Okayama (JP); Katsumi Fujiki, Okayama (JP)

(73) Assignees: Yanmar Agricultural Equipment Co., Ltd., Osaka (JP); Seirei Industry Co., Ltd., Okayama (JP)

( * ) Notice: Subject to any disclaimer, the term of this patent is extended or adjusted under 35 U.S.C. 154(b) by 429 days.

(21) Appl. No.: 10/509,653

(22) PCT Filed: Mar. 20, 2003

(86) PCT No.: PCT/JP03/03486

§ 371 (c)(1),
(2), (4) Date: Sep. 29, 2004

(87) PCT Pub. No.: WO03/082620

PCT Pub. Date: Oct. 9, 2003

(65) Prior Publication Data

US 2005/0150698 A1    Jul. 14, 2005

(30) Foreign Application Priority Data

Mar. 29, 2002 (JP) ............................. 2002-096890
Mar. 29, 2002 (JP) ............................. 2002-096891

(51) Int. Cl.
*B60K 17/00* (2006.01)
(52) U.S. Cl. ...................................... 180/337; 74/730.1
(58) Field of Classification Search ................ 180/337, 180/367, 364; 74/730.1–733.1, 15.2–15.88; 475/21–24, 27, 28
See application file for complete search history.

(56) References Cited

U.S. PATENT DOCUMENTS

RE34,833 E * 1/1995 Hasegawa et al. ............ 475/83
5,913,950 A   6/1999 Matsufuji (Continued)

FOREIGN PATENT DOCUMENTS

JP           2001-260932           9/2001

(Continued)

OTHER PUBLICATIONS

Apr. 23, 1991 Microfilm of the specification and drawings annexed to the request of Japanese Utility Model Application No. 103778/1989 (Laid-open No. 43166/1991) (Toyo Umpanki Co., Ltd.).

*Primary Examiner*—Paul N. Dickson
*Assistant Examiner*—Drew J. Brown
(74) *Attorney, Agent, or Firm*—Jordan and Hamburg LLP

(57) ABSTRACT

A traveling vehicle, wherein a power transmission system for traveling straight forward, a power transmission system for turning, a power transmission system for PTO, and a power transmission system for driving a pump are disposed in a transmission part integrally with each other and a transmission device for traveling straight forward and a continuously variable transmission device for turning are interlockingly installed in the transmission part continuously with each other in a parallel state, whereby the transmission systems can be compactly disposed in the transmission part, and all of the power transmission system for traveling straight forward, the power transmission system for turning, the power transmission system for PTO, and the power transmission system for driving the pump can be easily assembled by merely installing the transmission part on a body frame.

5 Claims, 10 Drawing Sheets

U.S. PATENT DOCUMENTS

| | | | |
|---|---|---|---|
| 6,126,564 A * | 10/2000 | Irikura et al. | 475/24 |
| 6,250,414 B1 | 6/2001 | Sato | |
| 6,283,236 B1 | 9/2001 | Teal | |
| 6,397,966 B1 * | 6/2002 | Irikura et al. | 180/307 |
| 6,447,419 B1 * | 9/2002 | Irikura et al. | 475/24 |
| 6,524,205 B1 * | 2/2003 | Irikura et al. | 475/23 |
| 6,601,474 B2 * | 8/2003 | Ishimaru et al. | 74/665 GA |
| 7,040,445 B2 * | 5/2006 | Ishii et al. | 180/307 |
| 7,150,693 B2 * | 12/2006 | Ishimaru et al. | 475/206 |

FOREIGN PATENT DOCUMENTS

| | | |
|---|---|---|
| JP | 2002-337757 | 11/2002 |

\* cited by examiner

TRAVELING VEHICLE

TECHNICAL FIELD

The present invention relates to a traveling vehicle.

BACKGROUND ART

As one mode of a conventional traveling vehicle, there has been known a traveling vehicle in which power can be transmitted from a continuously variable transmission device for turning which is interlockingly connected with an engine to a power transmission system for turning which is disposed in the inside of a front transmission part, while power can be transmitted from a continuously variable transmission device for traveling straight forward which is interlockingly connected with the engine to a power transmission system for traveling straight forward which is disposed in the front transmission part by way of a rear transmission part, and these powers of the power transmission system for turning and the power transmission system for traveling straight forward are combined by a planetary gear mechanism which is disposed in the front mission part, and a resultant force is transmitted to left-and-right-side drive wheels respectively.

Then, a PTO shaft is interlockingly connected with the rear transmission part by way of a PTO transmission part, and a power transmission system for PTO is disposed in the PTO transmission part so that the speed of the PTO shaft can be changed in plural stages due to the power transmission system for PTO.

Further, a parking brake is provided to the outside of the front transmission part.

However, in the above-mentioned traveling vehicle, the front transmission part, the rear transmission part and the PTO transmission part are respectively formed as separate bodies and hence, it is necessary to provide transmission means such as transmission shafts for interlockingly connecting these transmission parts with each other and hence, time and efforts are necessary for an operation to interlockingly connect these transmission parts and, at the same time, it is difficult to arrange these transmission systems in a compact manner as a whole.

Further, since the parking brake is provided outside the front transmission part, it is necessary to provide a protective cover to protect the parking brake from splashed mud, soil and the like.

Further, while a steering wheel is interlockingly connected with the continuously variable transmission device for turning by way of an operation mechanism for turning, a forward/backward traveling changeover lever is interlockingly connected with the transmission device for traveling straight forward by way of an operation mechanism for traveling straight forward. The continuously variable transmission device for turning is operated by a steering wheel by way of an operation mechanism for turning and, at the same time, the transmission device for traveling straight forward is operated by the forward/backward traveling changeover lever by way of the operation mechanism for traveling straight forward thus enabling a given steering operation.

However, in the above-mentioned traveling vehicle, when the respective transmission devices are operated using the steering wheel and the forward/backward traveling changeover lever, an operator receives an operation load from the respective transmission devices or a reverse load (a so-called kickback) acts on the respective operation mechanisms due to a load applied to the respective transmission devices. Accordingly, the operator cannot perform the swift and light operation thus giving rise to a drawback that the operator easily becomes tired.

DISCLOSURE OF THE INVENTION

In view of the above circumstances, according to the present invention, in a traveling vehicle which interposes a body frame between a pair of left and right traveling parts and mounts a prime mover part and a transmission part which is interlockingly connected with the prime mover part on the body frame, a power transmission system for traveling straight forward, a power transmission system for turning, a power transmission system for PTO and a power transmission system for driving a pump are integrally arranged in the inside of a transmission part, and a transmission device for traveling straight forward and a continuously variable transmission device for turning are interlockingly arranged in a juxtaposed state in the above-mentioned transmission part.

Then, the transmission part includes a transmission front lid portion, a transmission body portion which is integrally formed with an axle case, and a transmission intermediate portion which is provided between the transmission front lid portion and the transmission body portion. In the inside of the above-mentioned transmission part, the power transmission system for traveling straight forward, the power transmission system for turning, a power transmission system for PTO and a power transmission system for driving a pump are integrally disposed. Power inputted to the traveling vehicle from the prime mover part through the transmission front lid portion is branched and transmitted into the power transmission system for traveling straight forward, the power transmission system for turning, and a power transmission system for PTO in the transmission intermediate portion and the transmission front lid portion. A parking brake and a PTO clutch are arranged in the above-mentioned mission intermediate portion.

Further, the transmission device for traveling straight forward and the continuously variable transmission device for turning are interlockingly connected with the above-mentioned transmission part in a juxtaposed state and charge ports of these transmission devices are communicably connected with each other through a charge oil passage formed in the inside of a wall portion of the transmission part.

Further, according to the present invention, the continuously variable transmission device for turning and the transmission device for traveling straight forward are interlockingly and closely arranged with each other, a steering wheel is interlockingly connected with the continuously variable transmission device for turning by way of an operation mechanism for turning, a forward/backward traveling changeover lever is interlockingly connected with the above-mentioned transmission device for traveling straight forward by way of an operating mechanism for traveling straight forward, a booster for turning operation is formed on an intermediate portion of the operating mechanism for turning, and a booster for traveling straight forward is formed on an intermediate portion of the operation mechanism for traveling straight forward.

Then, the booster for turning operation, an interlocking operation member of the booster for turning operation, a booster for traveling straight forward, and an interlocking operation member of the booster for traveling straight forward are arranged along positions in the vicinity of left and right body frame forming members which are arranged such that these members extend in the fore-and-aft direction.

Each booster adopts a hydraulic actuation method, wherein a working oil is supplied to respective boosters by way of booster supply oil passages which are formed by branching from charge oil passages to the above-mentioned transmission devices.

That is, in the traveling vehicle according to the present invention, the body frame is interposed between a pair of left and right traveling parts, a prime mover part and a transmission part which is interlockingly connected with the prime mover part are provided to the body frame, a power transmission system for traveling straight forward, a power transmission system for turning, a power transmission system for PTO and a power transmission system for driving a pump are integrally arranged in the transmission part, and the transmission device for traveling straight forward and the continuously variable transmission device for turning are interlockingly connected with the transmission part in a juxtaposed state.

Due to such a constitution, it is possible to arrange the transmission systems compactly as a whole in the inside of the transmission part and, at the same time, it is possible to simply assemble all transmission systems including the power transmission system for traveling straight forward, the power transmission system for turning, the power transmission system for PTO and the power transmission system for driving the pump by simply mounting the transmission part on the body frame.

Further, since the transmission device for traveling straight forward and the continuously variable transmission device for turning are interlockingly connected with the transmission part in a juxtaposed state, the operation systems of both transmission devices can be also arranged in a juxtaposed state whereby these operation systems can be arranged compactly and, at the same time, these operation systems can be surely operated.

Further, the transmission part includes a transmission front lid portion, a transmission body portion which is integrally formed with an axle case and a transmission intermediate portion which is provided between the transmission front lid portion and the transmission body portion. In the inside of the above-mentioned transmission part, the power transmission system for traveling straight forward, the power transmission system for turning, the power transmission system for PTO and the power transmission system for driving the pump are integrally arranged.

Then, power which is inputted from the prime mover part through the transmission front lid portion is designed to be branched and transmitted to the power transmission system for traveling straight forward, the power transmission system for turning and the power transmission system for PTO at the transmission intermediate portion and the transmission front lid portion, while a parking brake and a PTO clutch are arranged in the inside of the above-mentioned transmission intermediate portion.

Due to such a constitution, it is possible to compactly arrange the transmission systems as a whole in the inside of the transmission part and, at the same time, it is possible to simply assemble the power transmission system for traveling straight forward, the power transmission system for turning, the power transmission system for PTO and the power transmission system for driving the pump by merely mounting the transmission part on the body frame.

Here, the transmission part includes the transmission front lid portion, the transmission body portion which is integrally formed with the axel case and the transmission intermediate portion which is formed between the transmission front lid portion and the transmission body portion, wherein power which is inputted from the prime mover part through the transmission front lid portion is transmitted in a branched manner to the power transmission system for traveling straight forward, the power transmission system for turning and the power transmission system for PTO at the transmission intermediate portion and the transmission front lid portion. Accordingly, the branching of respective power transmission systems in the transmission body portion in accordance with the systems can be performed neatly and hence, a dead space in the axial direction can be reduced whereby the transmission part can be manufactured compactly.

Further, since the parking brake and the PTO clutch are arranged in the inside of the transmission intermediate portion, it is no more necessary to provide a protective cover for protecting these parking brake and PTO clutch from splashed mud, soil and the like. Further, by removing the transmission front lid portion, it is possible to easily perform the maintenance of these parts.

Further, the transmission device for traveling straight forward and the continuously variable transmission device for turning are interlockingly connected with the transmission part in a juxtaposed state and charge ports of these transmission devices are communicably connected with each other through a charge oil passage formed in the inside of a wall portion of the transmission part and hence, it is also possible to arrange the operation systems of both transmission devices in a juxtaposed state whereby these operation systems can be arranged compactly and, at the same time, these operation systems can be surely operated.

Furthermore, the charge ports of these transmission devices are communicably connected with each other through the charge oil passage formed in the inside of the wall portion of the transmission part and hence, the oil supply piping can be reduced as much as possible and, at the same time, the oil supply passages can be arranged in a concentrated manner.

Further, the continuously variable transmission device for turning and the transmission device for traveling straight forward are interlockingly connected with the transmission part. A steering wheel is interlockingly connected with the continuously variable transmission device for turning by way of a operation mechanism for turning, while a forward/backward traveling changeover lever is interlockingly connected with the above-mentioned transmission device for traveling straight forward by way of the operation mechanism for traveling straight forward. Further, a booster for turning operation is mounted on an intermediate portion of the above-mentioned operation mechanism for turning, while a booster for traveling straight forward is mounted on an intermediate portion of the operation mechanism for traveling straight forward.

Accordingly, at the time of operating the continuously variable transmission device for turning using the steering wheel by way of the mechanism for operating turning, due to the provision of the booster for turning which is provided to the intermediate portion of the operation mechanism for turning, an operation load of the continuously variable transmission device for turning can be reduced and hence, it is possible to operate the continuously variable transmission device for turning with a slight operation load.

Further, even when a reverse load (so-called kickback) acts on the operation mechanism for turning due to the load to the continuously variable transmission device for turning, the booster for turning performs a buffer function and hence, it is possible to favorably ensure the operability of the steering wheel.

Further, at the time of operating the transmission device for traveling straight forward using the forward/backward traveling changeover lever by way of the operation mechanism for traveling straight forward, due to the provision of the booster for traveling straight forward which is provided to the intermediate portion of the operation mechanism for traveling straight forward, it is possible to reduce the operation load of the transmission device for traveling straight forward whereby it is possible to operate the transmission device for traveling straight forward with the slight operation load.

Further, even when a reverse load (a so-called kickback) acts on the operation mechanism for traveling straight forward due to the load to the transmission device for traveling straight forward, the booster for traveling straight forward performs a buffer function and hence, it is possible to favorably ensure the operability of the fore-and-aft traveling changeover lever.

Here, the booster for turning operation, an interlocking operation member of the booster for turning operation, a booster for traveling straight forward, and an interlocking operation member of the booster for traveling straight forward are arranged along positions in the vicinity of left and right side body frame forming members which are arranged such that these members extend in the fore-and-aft direction.

Due to such a constitution, when the respective boosters are operated, it is possible to prevent a phenomenon that the respective interlocking operation members interfere with other installed objects and give rise to erroneous operations, at the same time, it is possible to protect outer side portions of the respective boosters from splashed mud, soil and the like due to the left and right-side body frame.

Further, the respective boosters adopt the hydraulic actuation method and the working oil is supplied to the respective boosters by way of the booster supply oil passages which are formed by branching from the charge oil passages leading to the above-mentioned transmission devices and hence, it is possible to make the booster supply oil passage as short as possible and, at the same time, it is possible to surely supply the working oil to the respective boosters from the charge oil passages of the transmission device through the booster supply oil passages whereby the function of the respective boosters can be favorably ensured.

BEST MODE FOR CARRYING OUT THE INVENTION

Figure 1:
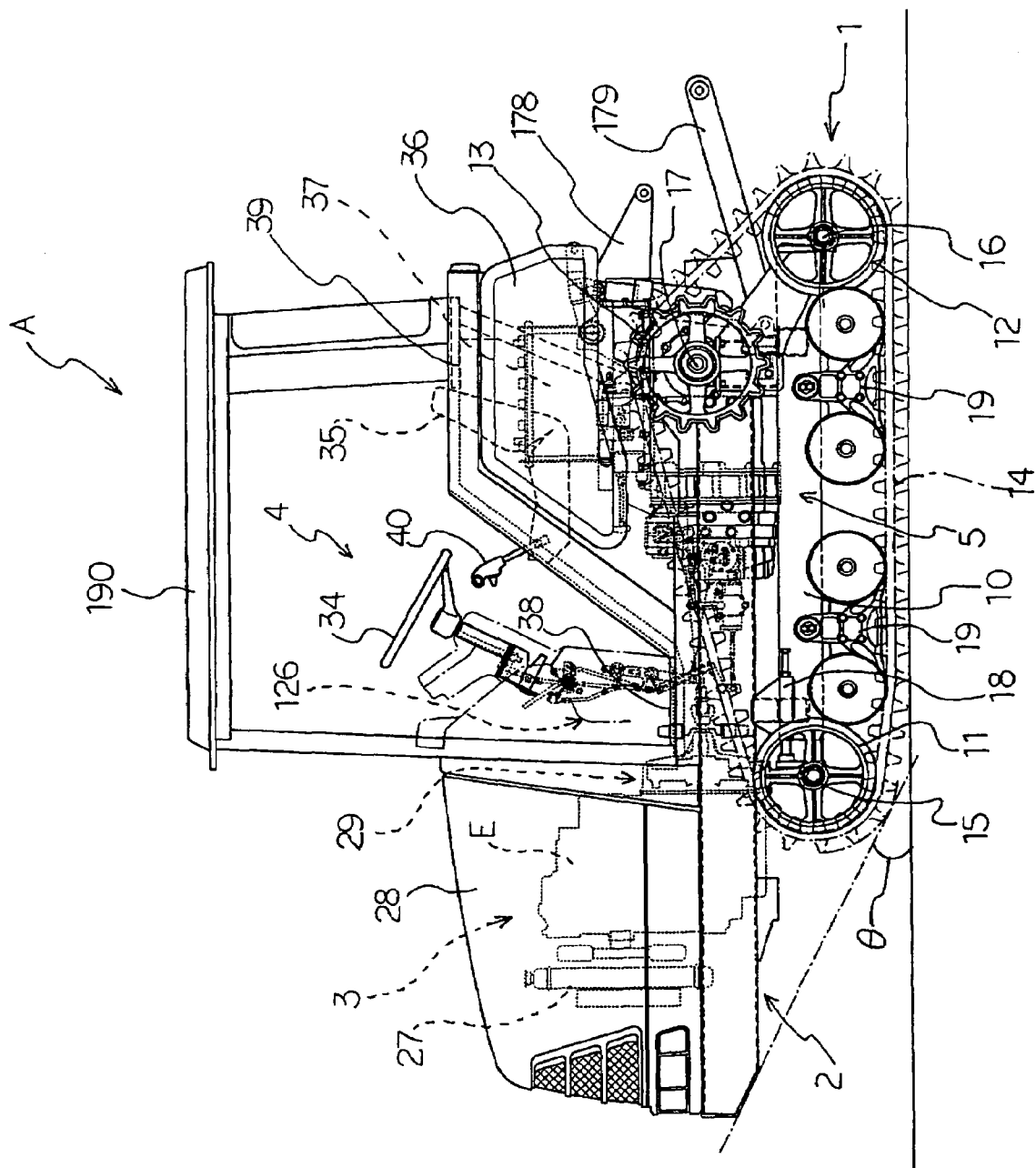
FIG. 1 is a side view of a traveling vehicle according to the present invention.

An embodiment of the present invention is explained hereinafter in conjunction with drawings.

Symbol A shown in FIG. 1 to FIG. 4 indicates a traveling vehicle according to the present invention, wherein the traveling vehicle A spans a body frame 2 between a pair of left and right crawler type traveling parts 1, 1, provides a prime mover part 3 in front of the body frame 2, provides a driver part 4 at a rear portion, and provides a transmission part 5 at a position below the driver part.

As shown in FIG. 1 to FIG. 4, each traveling part 1 includes a traveling frame 10 which extends in the fore-and-aft direction, front and rear driven wheels 11, 12 which are respectively mounted on front and rear end portions of the traveling frame 10, a drive wheel 13 which is arranged between both front and rear driven wheels 11, 12 and at an upper position, and a crawler belt 14 which is wound around between movable wheels 11, 12, 13 and has a triangular shape as viewed from the side. Numeral 15 indicates a front pivot shaft for a driven wheel, numeral 16 indicates a rear pivot shaft for a driven wheel, numeral 17 indicates a pivot shaft for a drive wheel, numeral 18 indicates an adjuster for advanced or retracted position of the front driven wheel, numeral 19 indicates an equalizer, numeral 20 indicates a crawler belt removal prevention body, and symbol θ indicates an angle at which a crawler belt leaves a ground level.

Further, between the pair of left and right traveling frames 10, 10, as shown in FIG. 1 to FIG. 4, a pair of front and rear connection frames 21, 22 which extend in the left and right direction are extended in a traversing manner.

The body frame 2 includes, as shown in FIG. 1 to FIG. 4, a pair of left and right body frame forming members 23, 23 which extend in the fore-and-aft direction, a transmission part 5 which is extended between rear portions of the body frame forming members 23, 23, and axle case 24 which is formed such that the axle case 24 extends outwardly in the left and right direction from left-and-right side rear portions of the transmission part 5.

Then, intermediate portions of the pair of left and right body frame forming members 23, 23 are fixed to the front connection frame 21 and, at the same time, the axle case 24 is extended between the pair of left and right support bases 25, 25 which are mounted on rear portions of the left and right traveling frames 10, 10 in an upwardly erected manner.

With respect to a prime mover part 3, as shown in FIG. 1, an engine E is mounted between front portions of the pair of left and right body frame forming members 23, 23, a radiator 27 is arranged in front of the engine E, and these elements are covered with a bonnet 28.

Figure 2:
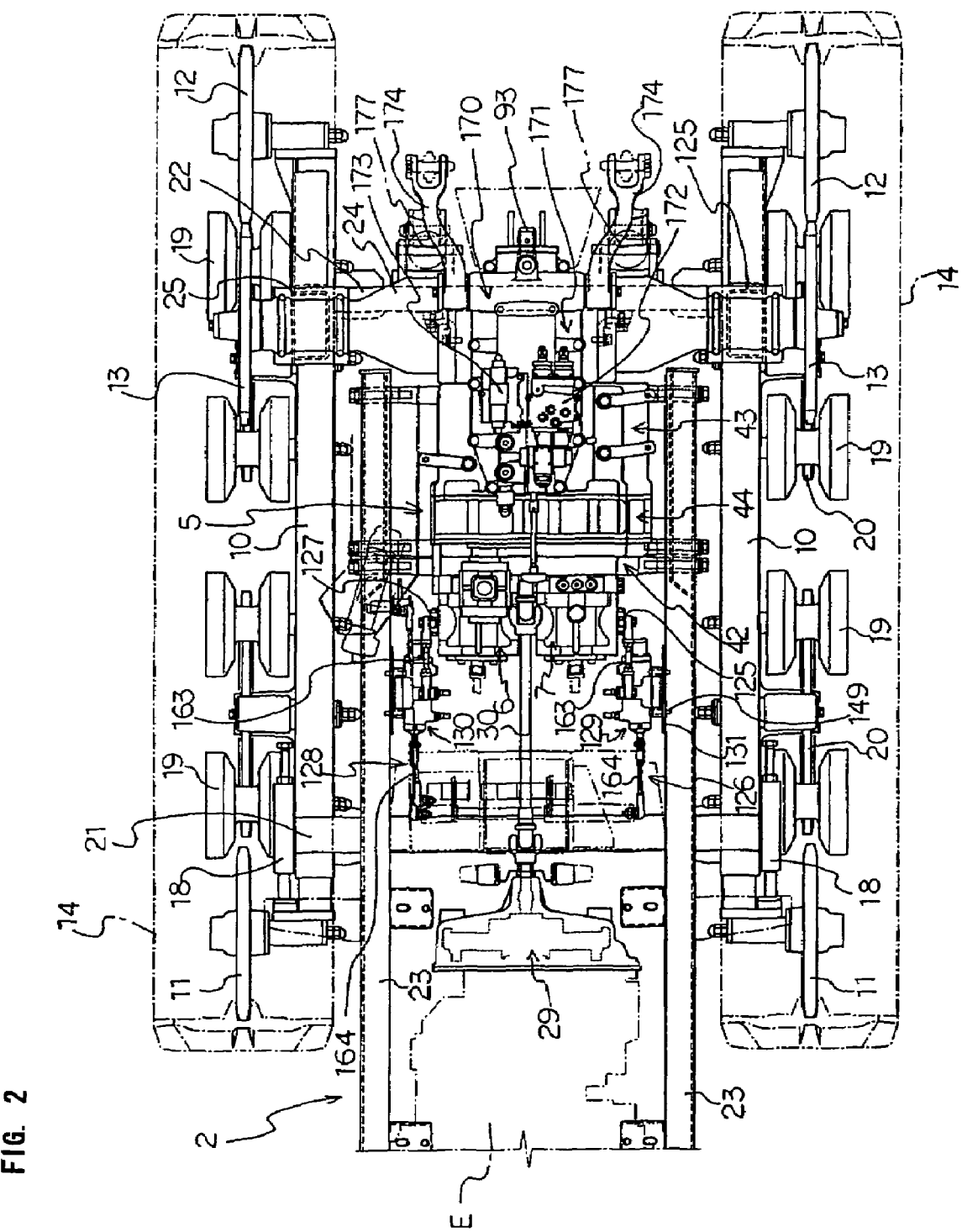
FIG. 2 is a plan view of a transmission part of the traveling vehicle.
Figure 3:
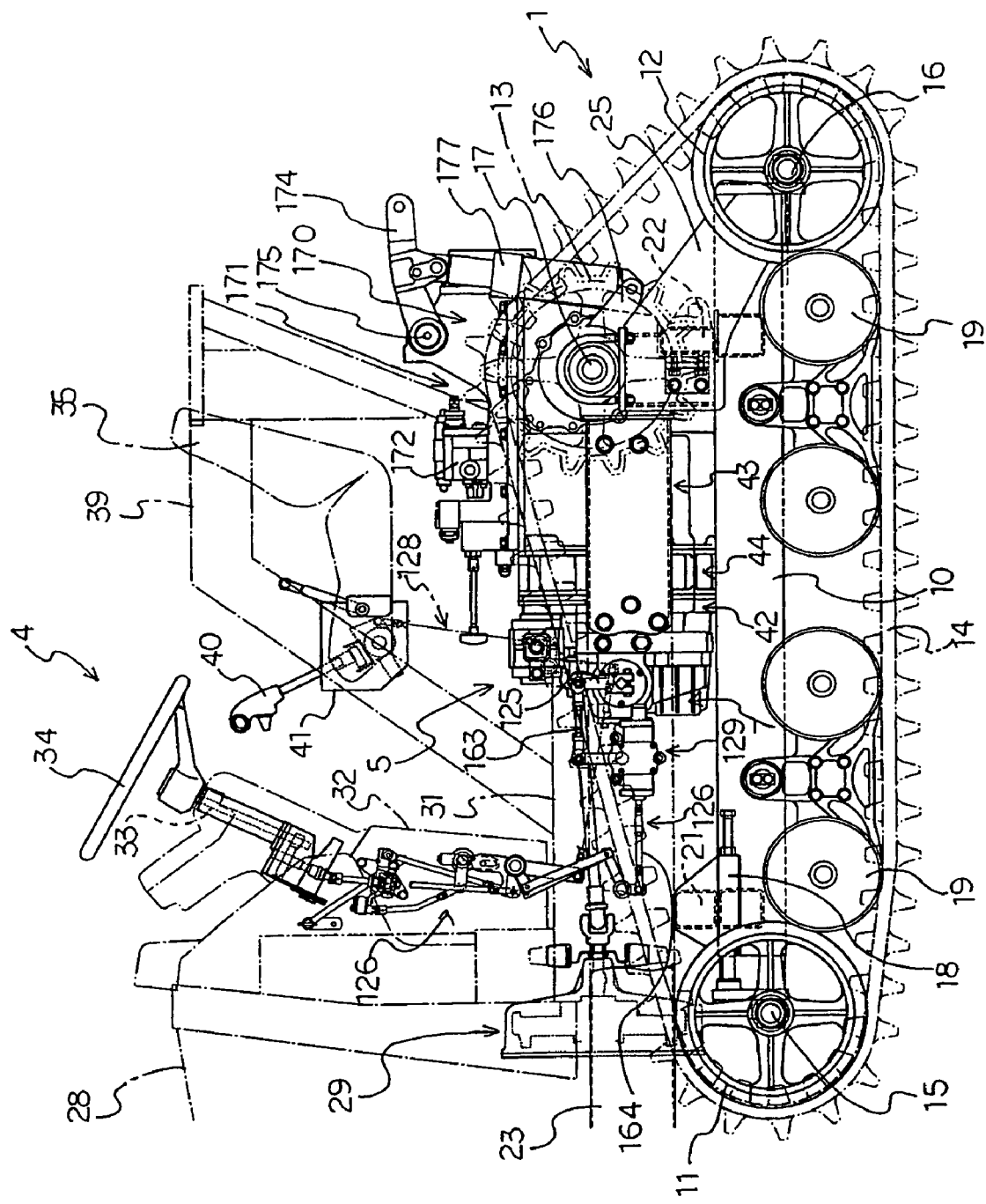
FIG. 3 is a side view of the transmission part.
Figure 4:
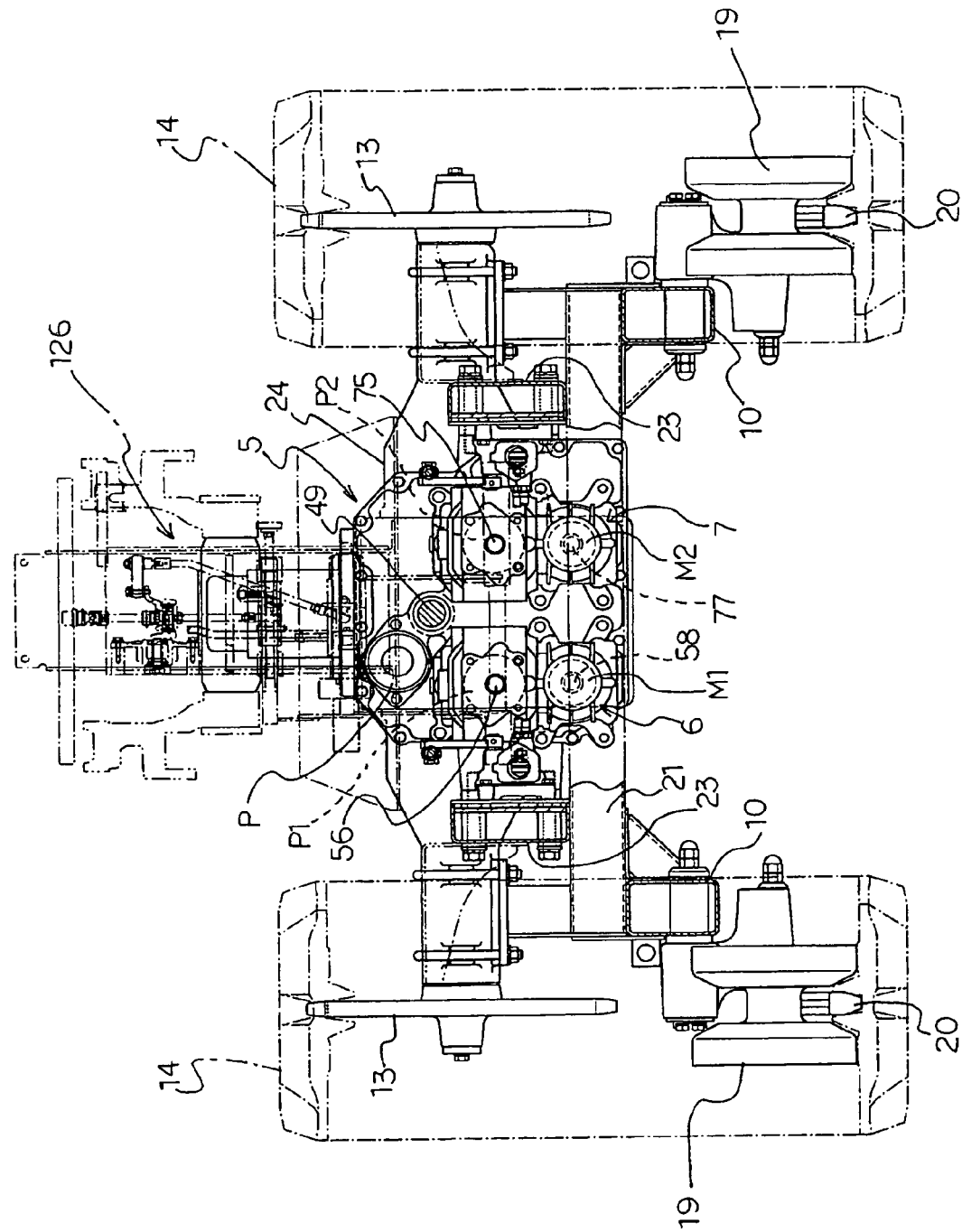
FIG. 4 is a front view of the transmission part.

Then, as shown in FIG. 2 and FIG. 3, a flywheel portion 29 is interlockingly provided at a rear portion of the engine E, while the transmission part 5 is interlockingly connected the flywheel portion 29 by way of a transmission shaft 30.

In the driver part 4, as shown in FIG. 1 to FIG. 3, a driver part support body 31 is formed on an intermediate portion of the body frame 2, a steering column 32 is mounted on a front portion of the driver part support body 31 in an erected manner, a steering wheel 34 is mounted on an upper end portion of the steering column 32 by way of a wheel support shaft 33, and a driver seat 35 is arranged at a position behind the steering wheel 34. Further, a fuel tank 36 is arranged at a left-side position of the driver seat 35 and a battery 37 is arranged at a right-side position of the driver seat 35.

Further, on a driver part support frame 31 which is positioned between a steering column 32 and the driver seat 35, a floor portion 38 is formed in an extended manner. Left and right support frame bodies 39, 39 are made to extend rearwardly and upwardly from intermediate portions at left and right sides of the floor portion 38 and a proximal end portion of a frontward/backward traveling changeover lever (transmission lever) 40 is mounted on the right support frame body 39 by way of a lever mounting body 41. Numeral 190 indicates a canopy.

The transmission part 5 is, as shown in FIG. 2 and FIG. 3, configured that a transmission front lid portion 42, a transmission body portion 43 which is integrally formed with the axle case 24, and a transmission intermediate portion 44 which is formed between the transmission front lid portion 42 and the transmission body portion 43 are replaceably connected with each other. Here, on the transmission front lid portion 42, a HST 6 for traveling straight forward which is a hydrostatic continuously variable transmission device as the transmission device for traveling straight forward and a HST 7 for turning which is a hydrostatic continuously variable transmission device as the continuously variable transmission device for turning are interlocking and closely arranged with each other in a juxtaposed state on the left and right sides.

Here, in this embodiment, the transmission body portion 43 and the axle case 24 are integrally formed compactly and hence, the transmission body 43 and the axle case 24 can be simply and surely mounted on the body frame 2.

Figure 5:
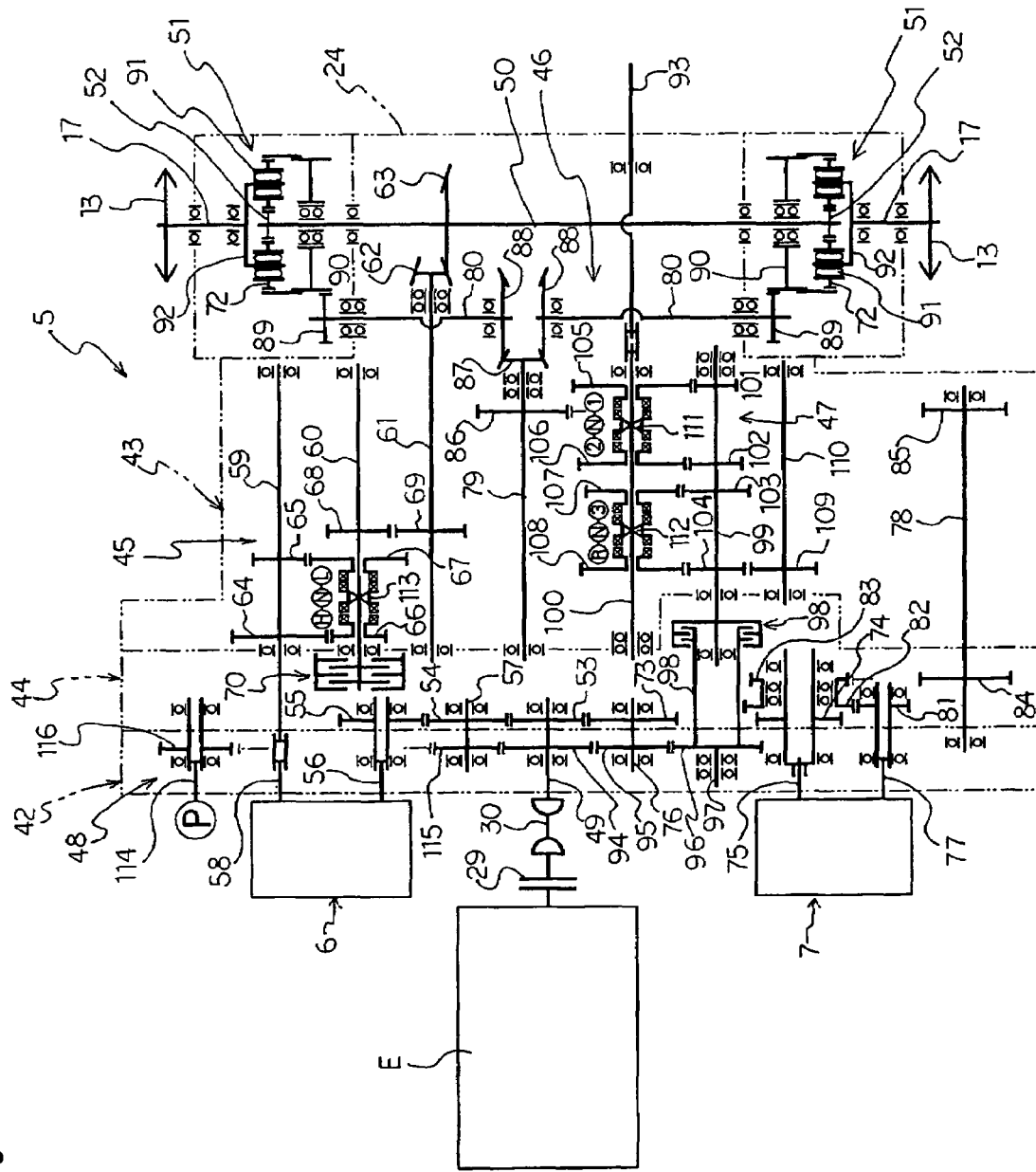
FIG. 5 is a conceptual explanatory view of a power transmission system in the inside of the transmission part.
Figure 6:
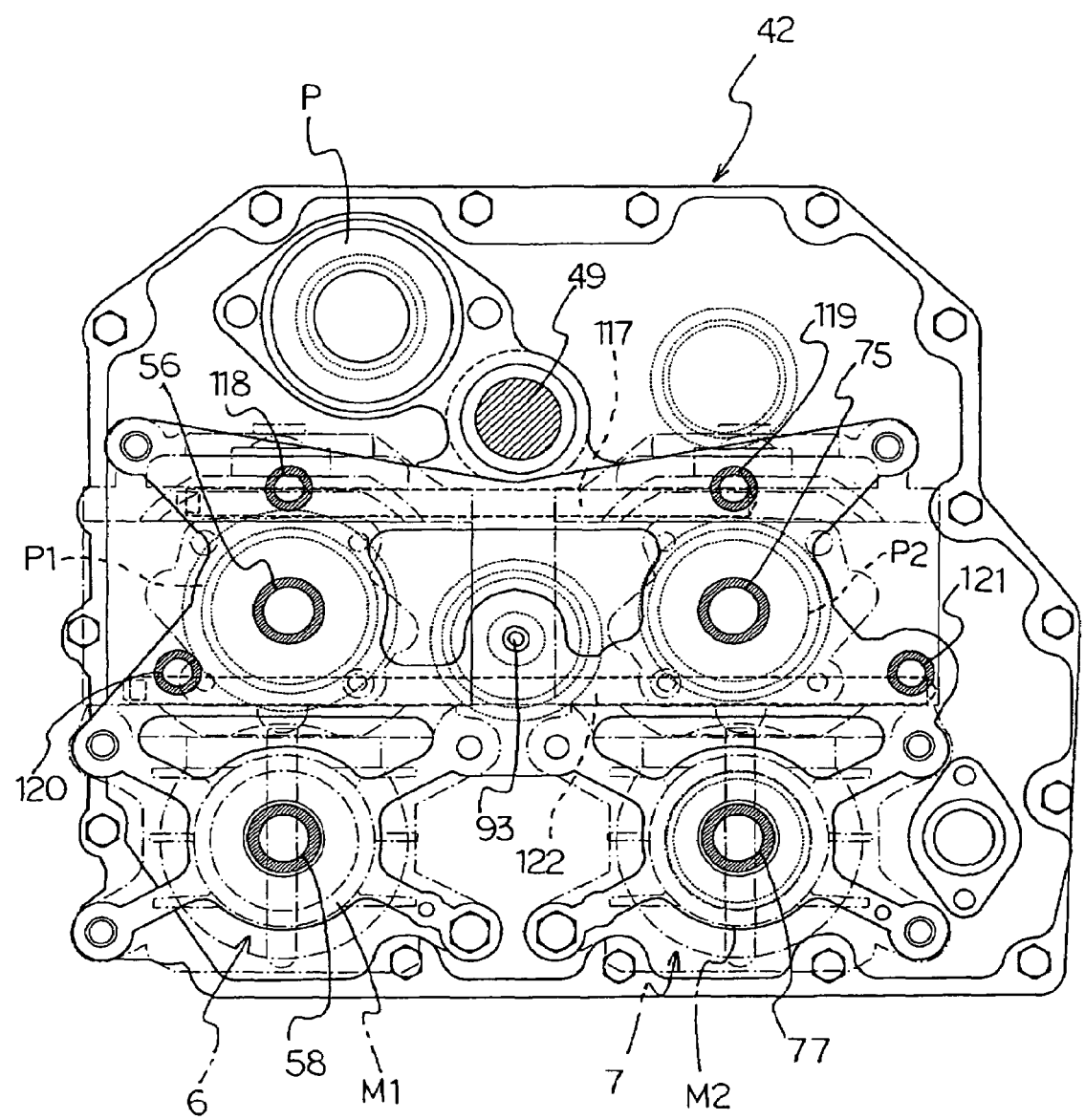
FIG. 6 is a front explanatory view of the transmission part.

Then, in the inside of the transmission part 5, as shown in FIG. 5, the power transmission system 45 for traveling straight forward, the power transmission system 46 for turning, the power transmission system 47 for PTO and the power transmission system 48 for driving the pump are integrally arranged. An input shaft 49 which is mounted in the transmission front lid portion 42 is interlockingly connected with the engine E by way of the flywheel portion 29 and the transmission shaft 30. Here, the power inputted through the input shaft 49 is transmitted to the power transmission system 45 for traveling straight forward and the power transmission system 46 for turning in the inside of the transmission intermediate portion 44, while the power inputted through the input shaft 49 is transmitted to the power transmission system 47 for PTO and the power transmission system 48 for driving a pump in the inside of the transmission front lid portion 42. That is, the power inputted through the input shaft 49 is transmitted by dividing these power transmission systems 45, 46, 47, 49 in two sets.

That is, as shown in FIG. 5, the power transmission system 45 for traveling straight forward is interposed between the input shaft 49 mounted in the transmission front lid portion 42 and the drive shaft 50 extended with an axis thereof directed in the left-and-right direction in the axle case 24. Sun gears 52, 52 of planetary gear mechanism 51, 51 which are arranged on left and right side portions in the axle case 24 are interlockingly connected with left and right end portions of the drive shaft 50.

Then, the input shaft 49 is extended with an axis thereof directed in the fore-and-aft direction of the vehicle body in the transmission front lid portion 42, wherein a first output gear 53 is mounted on a rear end portion of the input shaft 49 in the inside of the transmission intermediate portion 44, an input gear 55 for traveling straight forward is meshed with the first output gear 53 by way of an intermediate gear 54 for traveling straight forward in the transmission intermediate portion 44, and the input gear 55 for traveling straight forward is mounted on an input shaft 56 for traveling straight forward of the HST 6 for traveling straight forward having an axis thereof directed in the fore-and-aft direction at the right side portion of the transmission front lid portion 42. Numeral 57 indicates a first intermediate shaft which is extended between the transmission front lid portion 42 and the transmission intermediate portion 44 while having an axis thereof directed in the fore-and-aft direction.

Further, to an output shaft 58 for traveling straight forward which is projected rearwardly from the HST 6 for traveling straight forward in the inside of the transmission front lid portion 42, a front end portion of a first transmission shaft 59 for traveling straight forward which has an axis thereof extended in the fore-and-aft direction is interlockingly connected in the inside of the transmission body portion 43. A second transmission shaft 61 for traveling straight forward is interlockingly connected with the first transmission shaft 59 for traveling straight forward by way of a speed change shaft 60 for traveling straight forward. Further, the drive shaft 50 is interlockingly connected with a rear end portion of the second transmission shaft 61 for traveling straight forward by way of bevel gears 62, 63.

Here, the speed-change shaft 60 for traveling straight forward and the second transmission shaft 61 for traveling straight forward are respectively extended in the inside of the transmission body portion 43 while having axes thereof extended in the fore-and-aft direction. Further, these shafts 60, 61 are arranged in a parallel state with the first transmission shaft 59 for traveling straight forward. A large-diameter gear 64 and a small-diameter gear 65 are mounted on the first transmission shaft 59 for traveling straight forward, while a small-diameter speed-change gear 66 which is meshed with the above-mentioned large-diameter gear 64, a large-diameter speed-change gear 67 which is meshed with the above-mentioned small-diameter gear 65, and a speed-change output gear 68 are mounted on the speed-change shaft 60 for traveling straight forward. Further, a second input gear 69 for traveling straight forward which is mounted on the second transmission shaft 61 for traveling straight forward is meshed with the speed-change output gear 68. Numeral 113 indicates a shifter for speed-change operation for traveling straight forward.

In this manner, by operating the shifter 113 for speed-change operation for traveling straight forward, it is possible to change the speed in two stages, that is, a high speed and a low speed.

Further, to a front end portion of the speed-change shaft 60 for traveling straight forward, a parking brake 70 is interlockingly connected, wherein the parking brake 70 is disposed in the inside of the transmission intermediate portion 44.

The power transmission system 46 for turning is, as shown in FIG. 5, interposed between the input shaft 49 mounted in the transmission front lid portion 42 and ring gears 72, 72 of the planetary gear mechanisms 51, 51 which are arranged at left and right side portions in the axle case 24.

Then, with the first output gear 53 mounted on the input shaft 49, an input gear 74 for turning is meshed by way of an intermediate gear 73 for turning in the inside of the transmission intermediate portion 44. Here, the input gear 74 for turning is mounted on an input shaft 75 for turning of the HST 7 for turning which has an axis thereof directed in the fore-and-aft direction at the left side portion of the transmission front lid portion 42. Numeral 76 indicates a second intermediate shaft which is extended between the transmission front lid portion 42 and the transmission intermediate portion 44 while having an axis thereof directed in the fore-and-aft direction.

Further, to an output shaft 77 for turning which is projected rearwardly from the HST 7 for turning in the inside of the transmission front lid portion 42, a second transmission shaft 79 which is extended in the inside of the transmission body portion 43 while having an axis thereof extended in the fore-and-aft direction is interlockingly connected byway of a first transmission shaft 78 for turning which is extended over the transmission front lid portion 42, the transmission intermediate portion 44 and the transmission body portion 43 while having an axis thereof directed in the fore-and-aft direction. To this second transmission shaft 79 for turning, a pair of left and right third transmission shafts 80, 80 for turning which are extended in the inside of the transmission body portion 43 while having axes thereof directed in the left and right direction are interlockingly connected. Further, outer end portions of the respective third transmission shafts 80, 80 for turning are respectively interlockingly connected with the ring gears 72, 72 of the planetary gear mechanisms 51, 51.

Here, an output gear 81 for turning which is mounted on the output shaft 77 for turning is meshed with the large-diameter speed-change gear 82 which is rotatably mounted on the input shaft 75 for turning. With a small-diameter speed-change gear 83 which is integrally formed with the large-diameter speed-change gear 82, a first input gear 84 for turning which is mounted on the first transmission shaft 78 for turning is meshed. With a first output gear 85 for turning which is mounted on the first transmission shaft 78 for turning, a second input gear 86 for turning which is mounted on the second transmission shaft 79 for turning is meshed. With a second output bevel gear 87 for turning which is mounted on a rear end portion of the second transmission shaft 79 for turning, third input bevel gears 88, 88 for turning which are mounted on inner end portions of the pair of left and right third transmission shafts 80, 80 for turning are meshed. With third output gears 89, 89 for turning which are mounted on outer end portions of the respective third transmission shafts 80, 80 for turning, the ring gears 72, 72 are meshed by way of intermediate gears 90, 90.

Here, the planetary gear mechanism 51 is constituted such that a primary gear 91 is interposed between the above-mentioned sun gear 52 and the ring gear 72 and a drive wheel support shaft 17 is interlockingly connected with the primary gear 91 by way of a cage 92.

In this manner, the power which is transmitted to the sun gears 52, 52 from the power transmission system 45 for traveling straight forward and the power which is transmitted to the ring gears 72, 72 from the power transmission system 46 for turning are merged by the primary gears 91, 91 and the resultant forces are transmitted to the left-side and right-side drive wheel support shafts 17, 17.

The power transmission system 47 for PTO is, as shown in FIG. 5, interposed between the input shaft 49 which is mounted in the transmission front lid portion 42 and a PTO shaft 93 which is extended with an axis thereof directed in the fore-and-aft direction in the axle case 24 and, at the same time, has a rear end portion thereof projected rearwardly from the axle case 24.

Then, in the inside of the transmission front lid portion 42, with a second output gear 94 which is mounted on the input shaft 49, an input gear 96 for PTO is meshed by way of an intermediate gear 95 for PTO which is mounted on the second intermediate shaft 76. The input gear 96 for PTO is mounted on an input shaft 97 for PTO which is extended in the inside of the transmission front lid portion 42 with an axis thereof directed in the fore-and-aft direction.

Further, to the input shaft 97 for PTO, a first transmission shaft 99 for PTO which is extended in the inside of the transmission body portion 43 while having an axis thereof directed in the fore-and-aft direction is interlockingly connected by way of a PTO clutch 98 which is arranged in the inside of the transmission intermediate portion 44. On the other hand, to the first transmission shaft 99 for PTO, the above-mentioned PTO shaft 93 is interlockingly connected by way of a speed-change shaft 100 which is extended in the inside of the transmission intermediate portion 44 while having an axis thereof extended in the fore-and-aft direction.

Further, while first to fourth output gears 101, 102, 103, 104 are mounted on the first transmission shaft 99 for PTO, first to third speed-change gears 105, 106, 107 which are respectively meshed with the first to third output gears 101, 102, 103 are mounted on the PTO speed-change shaft 100. A reverse rotation gear 108 is meshed with the fourth output gear 104 by way of a counter gear 109 and the counter gear 109 is mounted on the counter shaft 110 which is extended in the inside of the transmission body portion 43 while having an axis thereof directed in the fore-and-aft direction. Numerals 111, 112 indicate first and second speed-change operation shifter for PTO.

In this manner, by changing over the connection to any one of the first to third speed-change gears 105, 106, 107 by operating the first and second speed-change operation shifters 111, 112 for PTO respectively, it is possible to change the speed of the PTO shaft 93 in three stages in the normal rotation. At the same time, by changing over the connection to the reverse rotation gear 108 by operating the second speed-change operation shifter 112 for PTO, it is possible to make the PTO shaft 93 rotate in the reverse direction.

The power transmission system 48 for driving the pump is, as shown in FIG. 5, interposed between the input shaft 49 which is mounted in the transmission front lid portion 42 and a pump drive shaft 114 which is extended over the transmission front lid portion 42 and the transmission intermediate portion 44 while having an axis thereof directed in the fore-and-aft direction. A tandem type charge pump P is interlockingly connected with the pump drive shaft 114 so as to drive the charge pump P.

Further, in the inside of the transmission front lid portion 42, an input gear 116 for driving a pump which is mounted on the pump drive shaft 114 is meshed with the second output gear 94 which is mounted on the input shaft 49 by way of an intermediate gear 115 for driving a pump which is mounted on the first intermediate shaft 57.

Further, as shown in FIG. 6 to FIG. 10, in the transmission front wall portion 42, a charge oil passage 117 which is communicably connected with the charge pump P is formed, wherein the respective charge ports 118, 119 of the HST 6 for traveling straight forward and the HST 7 for turning are communicated with each other through the charge oil passage 117 and, at the same time, respective return ports 120, 121 of the HST 6 for traveling straight forward and the HST 7 for turning are communicably connected with each other by way of a return oil passage 122 and a terminal end of the return oil passage 122 is connected with the transmission body portion 43 which functions as a working oil tank.

In this manner, since the respective charge ports 118, 119 of the HST 6 for traveling straight forward and the HST 7 for turning are communicably connected with each other by way of the charge oil passage 117 formed in the inside of the transmission front wall portion 42, it is possible to reduce the oil supply pipes as much as possible and, at the same time, the oil supply passage can be concentrated or integrated.

According to this embodiment, by imparting the above-mentioned constitution to the transmission part 5, it is possible to obtain the following manner of operation and advantageous effects.

That is, it is possible to compactly arrange the whole transmission systems in the inside of the transmission part 5 and, at the same time, it is possible to easily assemble the whole transmission systems consisting of the power transmission system 45 for traveling straight forward, the power transmission system 46 for turning, the power transmission system 47 for PTO and the power transmission system 48 for driving a pump by merely mounting the transmission part 5 on the body frame 2.

Here, the transmission part 5 includes the transmission front lid portion 42, the transmission body portion 43 which is integrally formed with the axle case 24, and the transmission intermediate portion 44 which is disposed between these transmission front lid portion 42 and the transmission body portion 43, wherein the power which is inputted from the engine E through the transmission front lid portion 42 is transmitted in a branched manner to the power transmission system 45 for traveling straight forward, the power transmission system 46 for turning and the power transmission system 47 for PTO at the transmission intermediate portion 44 and the transmission front lid portion 42. Accordingly, it is possible to neatly perform the branching of the respective power transmission systems 45, 46, 47 in accordance with systems at the transmission body portion 43 and hence, a dead space in the axial direction can be reduced whereby the transmission part 5 can be manufactured compactly.

Further, since the HST 6 for traveling straight forward and the HST 7 for turning are interlockingly and closely arranged in the transmission part 5 in a juxtaposed state, the operation mechanism 128 for traveling straight forward and the operation mechanism 126 for turning described later which constitute the operation systems of both HST 6, 7 can be arranged in a juxtaposed state whereby these operation mechanisms 128, 126 can be compactly arranged and, at the same time, these operation mechanisms 128, 126 can be surely operated.

Still further, since the parking brake 70 and the PTO clutch 98 are arranged in the inside of the transmission intermediate portion 44, it is no more necessary to provide a protective cover for protecting these parking brake 70 and PTO clutch 98 from splashed mud, soil and the like. Further, by removing the transmission front lid portion 42, it is possible to easily perform the maintenance of these parts.

On an upper surface of the transmission part 5, as shown in FIG. 2 and FIG. 3, a lift arm support body 170 is formed. A recessed portion 171 is formed in a center portion of the lift arm support body 170 and a hydraulic valve 172 for elevation and a hydraulic valve 173 for controlling rolling which constitute various kinds of hydraulic valves are arranged in parallel at left and right sides in the inside of the recessed portion 171.

In this manner, the hydraulic valve 172 for elevation and the hydraulic valve 173 for controlling rolling which constitute the various kinds of hydraulic valves are arranged in the inside of the recessed portion 171 formed on the upper surface of the transmission part 5 and hence, even when a driver seat 35 of the driver portion 4 is arranged at a position above the transmission part 5, it is possible to set a height of the driver seat 35 above a ground to a low value and hence, the position of center of gravity of the vehicle body as a whole including the weight of an operator who sits on the driver-seat 35 can be set to a position as low as possible whereby the traveling stability of the vehicle body can be enhanced.

Further, proximal end portions of a pair of left and right lift arms 174, 174 are pivotally supported on a rear portion of the lift arm support body 170 using a lift arm support shaft 175 which has an axis thereof directed in the left and right direction, while lift cylinders 177, 177 which perform the extensible and shrinkable operation in the up and down direction are interposed between intermediate portions of the respective lift arms 174, 174 and cylinder stays 176, 176 which are mounted on the left-side and right-side rear portions of the rear axle case 24 in a state that the cylinder stays 176, 176 project rearwardly and downwardly from the left and right rear portions of the rear axle case 24.

In this manner, by connecting various kinds of working machines (not shown in the drawing) to the lift arms 174, 174 by way of a top link stay 178 and a lower link 179 shown in FIG. 1 which constitute an elevation connection mechanism, it is possible to suitably elevate or lower each connected working machine.

Further, as shown in FIG. 2 and FIG. 3, the steering wheel 34 is interlockingly connected to a trunnion arm 125 of the HST 7 for turning by way of the operation mechanism 126 for turning, while the frontward/backward traveling changeover lever 40 is interlockingly connected with a trunnion arm 127 of the above-mentioned HST 6 for traveling straight forward by way of an operation mechanism 128 for traveling straight forward. A booster 129 for turning operation is mounted on an intermediate portion of the operation mechanism 126 for turning and, at the same time, the booster 129 for turning operation is arranged parallel to the HST 7 for turning. Further, a booster 130 for traveling straight forward is mounted on an intermediate portion of the operation mechanism 128 for traveling straight forward and, at the same time, the booster 130 for straight forward operation is arranged parallel to the HST 6 for traveling straight forward.

Figure 7:
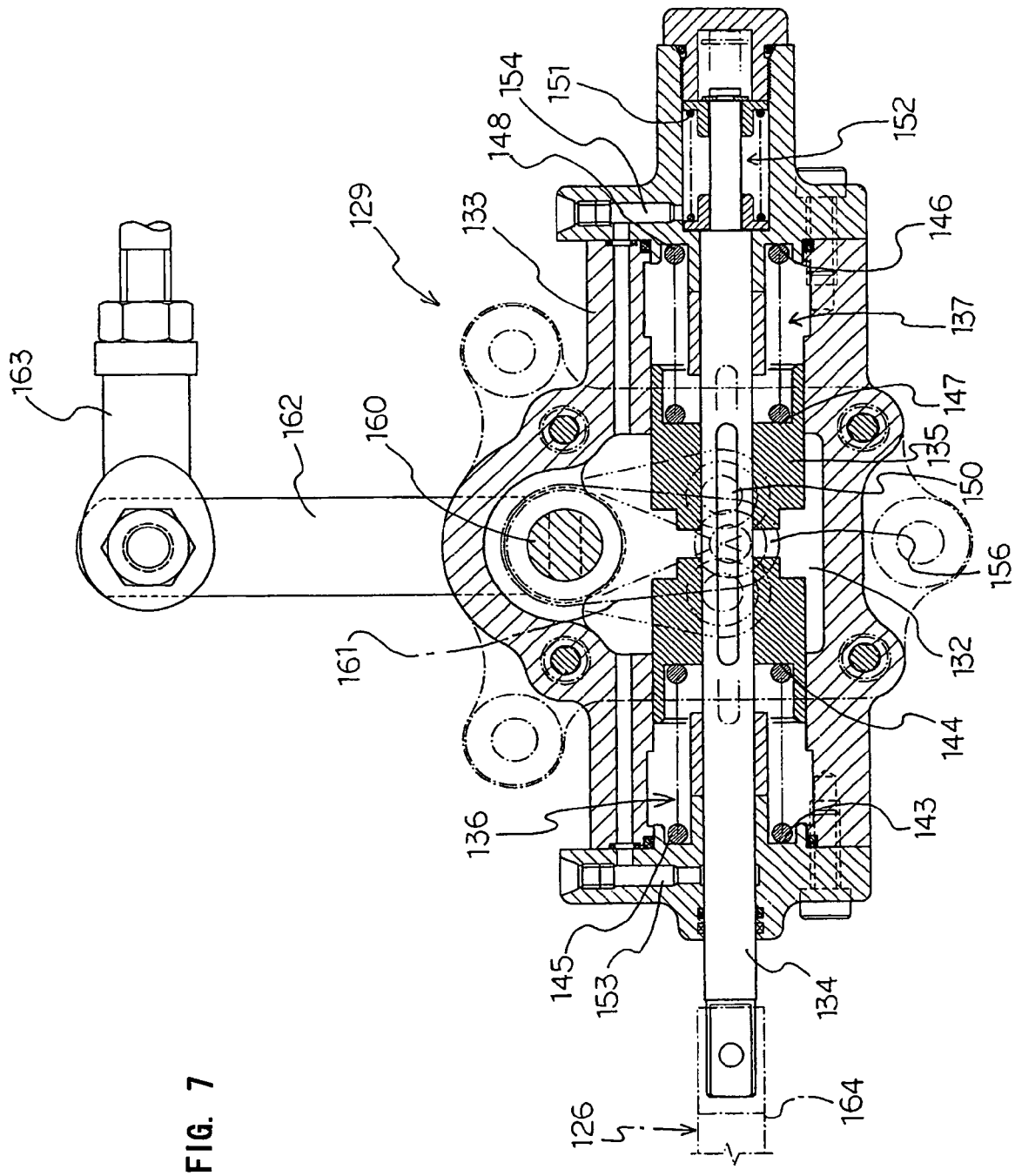
FIG. 7 is a cross-sectional side view of a booster.
Figure 8:
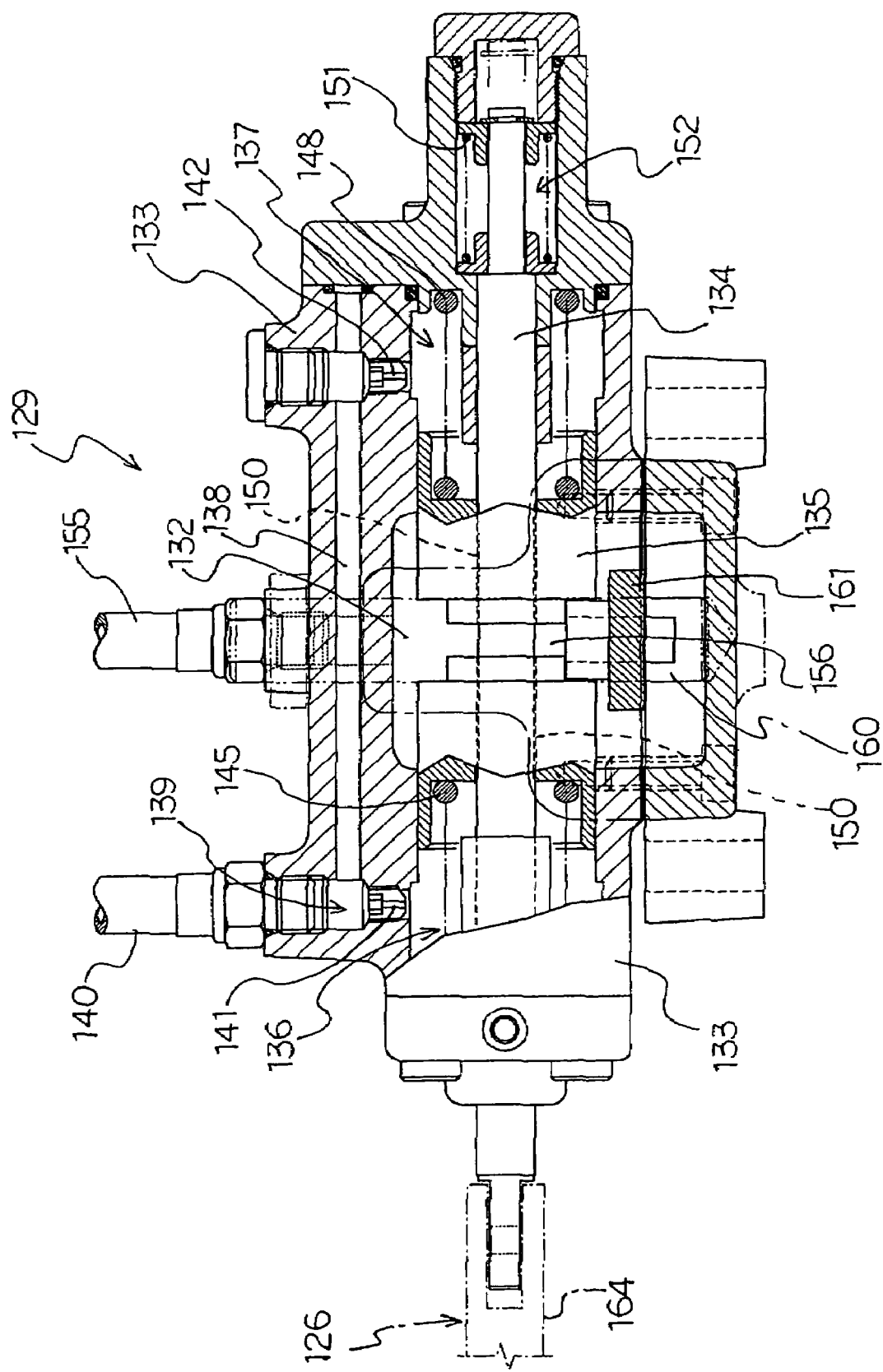
FIG. 8 is a cross-sectional plan view of the booster.
Figure 9:
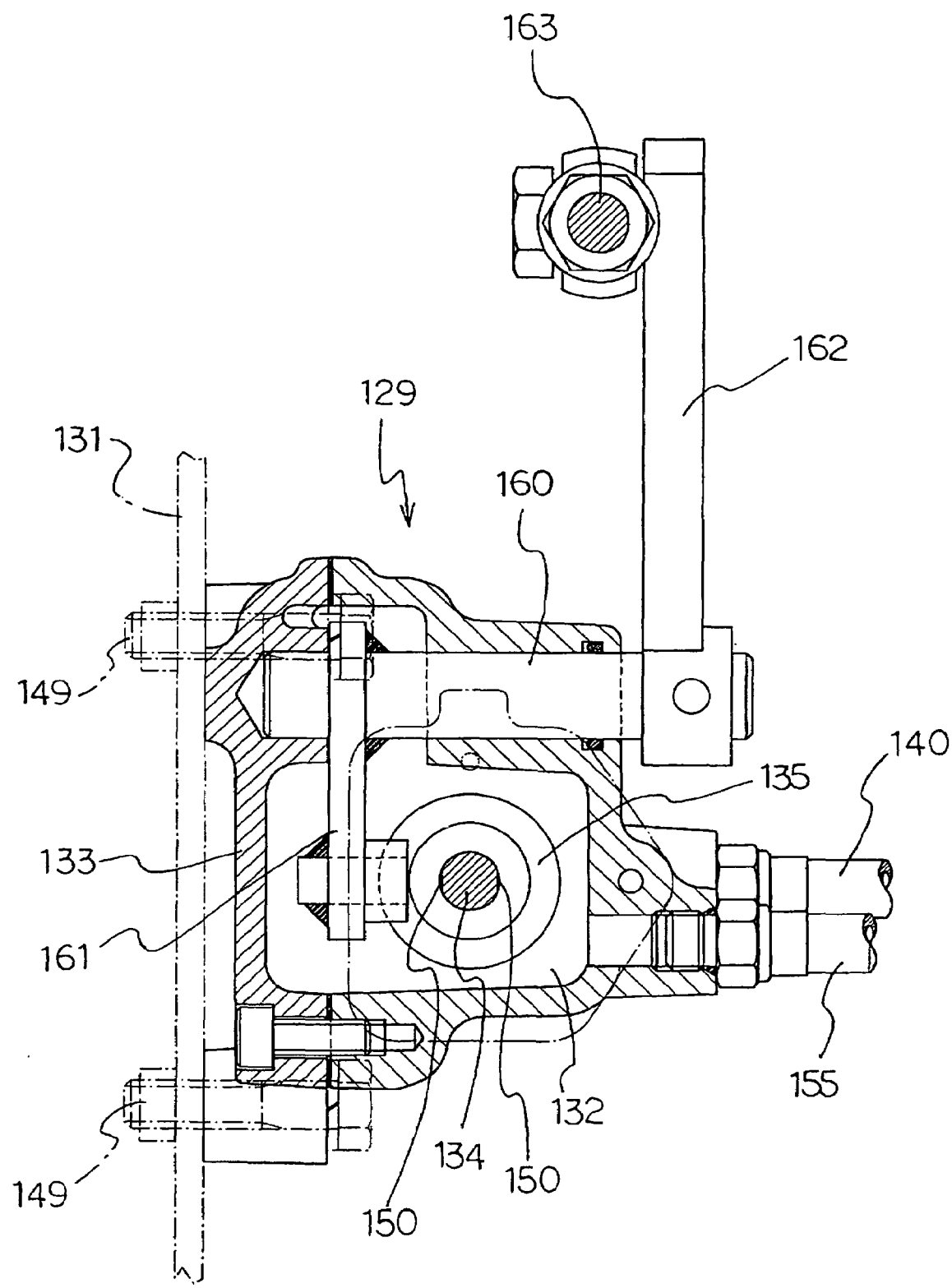
FIG. 9 is a cross-sectional back view of the booster.

That is, the booster 129 for turning operation is mounted on an inner surface of the intermediate portion of the left-side body frame forming member 23 by way of a stay 131 using a mounting bolt 149. With respect to the booster 129 for turning operation, as shown in FIG. 7 to FIG. 9, in a cylinder 133 which extends in the fore-and-aft direction and has an oil accumulating chamber 132 in a center portion thereof, a spool 134 which extends in the fore-and-aft direction is slidably inserted in the fore-and-aft direction, a piston 135 is mounted on a center portion of the spool 134, an outer peripheral surface of the piston 135 is slidably brought into contact with an inner peripheral surface of the cylinder 133, a front oil chamber 136 and a rear oil chamber 137 which are partitioned by the piston 135 are formed in the inside of the cylinder 133, both front and rear oil chambers 136, 137 are communicably connected with each other through a communication oil passage 138 for supplying which is formed in a peripheral wall of the cylinder 133, and a working oil supply pipe 140 which defines a booster supply oil passage 139 is communicably connected with the communication oil passage 138 for supplying.

Further, the spool 134 is arranged at a position in the vicinity of the left-side vehicle body frame forming member 23 in a state that the spool 134 is arranged along the vehicle body frame forming member 23 and has an axis thereof extended in the fore-and-aft direction. A front end portion of the spool 134 is interlockingly connected with an upstream-side connecting rod 164 which functions as an interlocking operation member forming an upstream-side portion of the operation mechanism 126 for turning.

In this manner, by making the piston 135 delicately slide in response to the pressure difference in the supply oil passage which is generated along with the sliding of the spool 134, it is possible to operate the HST 7 for turning in proportion to an operated variable of the steering wheel 34 whereby the operability can be enhanced.

Here, since the booster 129 for turning operation is arranged in parallel with the HST7 for turning, it is possible to compactly and surely connect the booster 129 for turning operation and the HST 7 for turning interlockingly by way of the operation mechanism 126 for turning whereby the operability can be enhanced also from this point.

Figure 10:
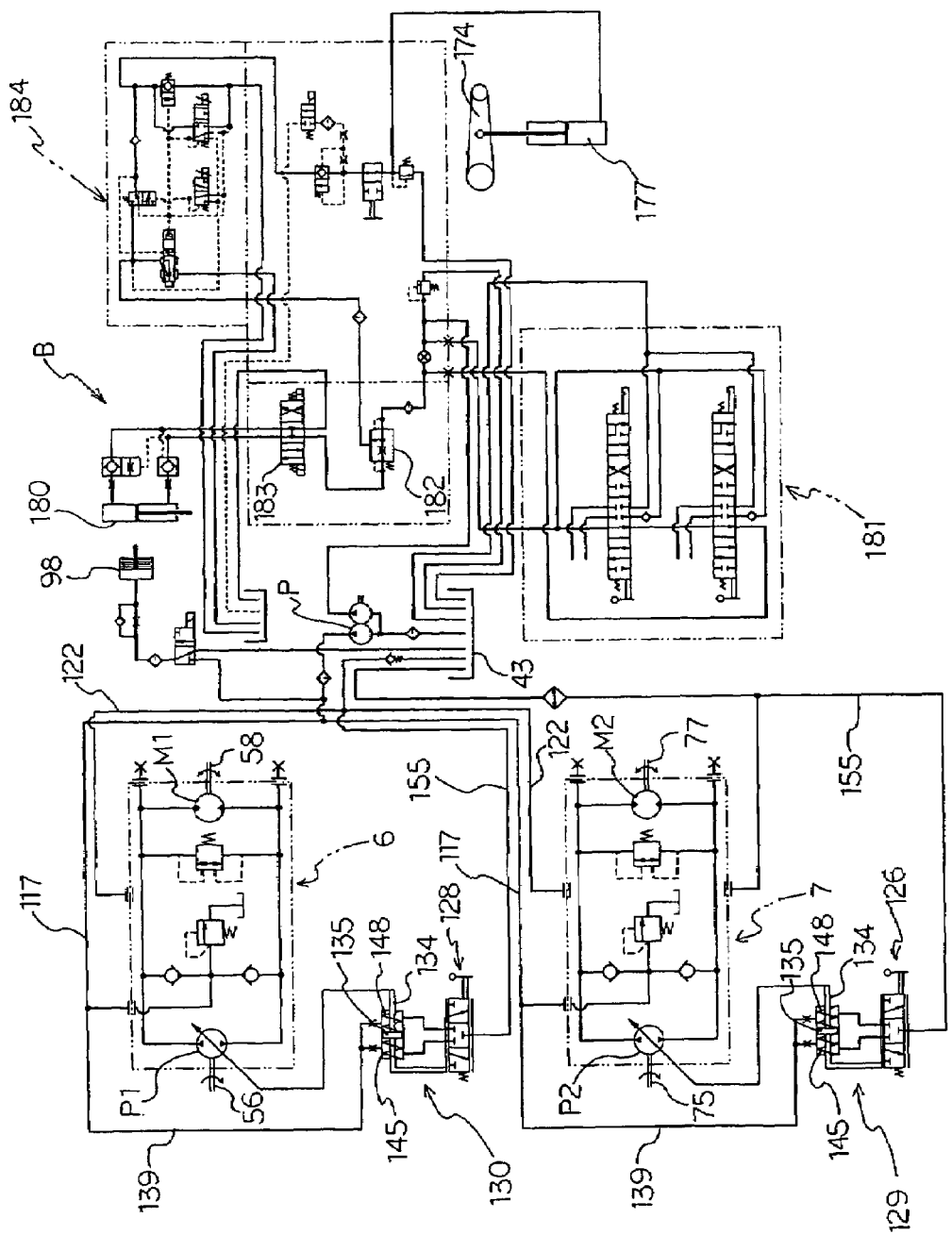
FIG. 10 is a hydraulic circuit diagram.

Further, the booster supply oil passage 139 is, as shown in FIG. 10 also, formed such that the booster supply oil passage 139 is branched from the charge oil passage 117 which supplies a working oil from the charge pump P to the HST 6 for traveling straight forward and the HST 7 for turning, wherein the working oil is supplied to the booster 129 for turning operation through this booster supply oil passage 139.

In this manner, it is possible to make the booster supply oil passage 139 as short as possible and, at the same time, it is possible to surely supply the working oil to the booster 129 for turning operation from the charge oil passage 117 which supplies the working oil to the HST 7 for turning through the booster supply oil passage 139 whereby the function of the booster 129 for turning operation can be favorably ensured.

At front and rear end portions of the communication oil passage 138 for supplying the working oil, as shown in FIG. 8, oil passage throttling portions 141, 142 are respectively formed, wherein by supplying the working oil into the respective front and rear oil chambers 136, 137 through the respective oil passage throttling portions 141, 142, it is possible to supply the working oil under a substantially fixed pressure.

Further, as shown in FIG. 7 and FIG. 8, a neutral position holding spring 145 which functions as neutral state holding resilient means is interposed between a front-wall inner surface 143 of the cylinder 133 and a front surface 144 of the piston 135, while a neutral position holding spring 148 which functions as neutral state holding resilient means is interposed between a rear-wall inner surface 146 of the cylinder 133 and a rear surface 147 of the piston 135. Due to the provision of both neutral state holding springs 145, 148, when there exists no pressure difference in the inside of the front and rear oil chambers 136, 137, the piston 135 is held in a neutral state which is disposed at a center portion of the cylinder 133.

Accordingly, when the steering wheel 34 and the frontward/backward traveling changeover lever 40 are not operated, the pistons 135, 135 are surely held in the neutral state due to the neutral state holding springs 145, 148 and hence, it is possible to surely prevent the erroneous operation of the respective HST 6, 7.

In left and right center portions on a peripheral surface of the spool 134 as shown in FIG. 7 to FIG. 9, slits 150, 150 for communication are formed by chamfering, both slits 150, 150 for communication are formed such that the slits 150, 150 extend in the axial direction of the spool 134 and, at the same time, the communication slits 150, 150 are formed with a width which is substantially equal to the front and rear widths of the front and rear surfaces of the piston 135. By allowing both slits 150, 150 for communication to be communicated with the oil accumulating chamber 132 through a communication oil passage 156 which is formed in the center portion of the piston 135, a change over valve is constituted as shown in FIG. 10. Numeral 151 indicates a spool return spring, numeral 152 indicates a spool return spring housing chamber, numerals 153, 154 indicate leaked oil recovering passages which are communicated with the oil accumulating chamber 132, and numeral 155 indicates a working oil return pipe which is communicably connected with the oil accumulating chamber 132.

Due to such a constitution, when the piston 135 is moved in either the frontward or rearward direction by way of the spool 134, for example, when the piston is moved in the rearward direction, the slits 150, 150 for communication are communicated with the rear oil chamber 137 and the working oil in the rear oil chamber 137 flows out into the working oil tank (the transmission body portion 43 in this embodiment) through a passage constituted of the slits 150, 150 for communication→the communication oil passage 156→the oil accumulating chamber 132→the working oil tank so that an internal pressure of the rear oil chamber 137 becomes small.

Here, the working oil is supplied from the charge pump P to the respective front and rear oil chambers 136, 137 through a passage constituted of the charge oil passage 117→the booster supply oil passage 139→communication oil passage 138 for supplying→the oil passage throttling portions 141, 142→the respective front and rear oil chambers 136, 137.

As a result, the pressure difference (the pressure difference of the supply oil passage) is generated between an internal pressure of the front oil chamber 136 and an internal pressure of the rear oil chamber 137 so that the spool 134 can be moved rearwardly due to pressurized oil.

Accordingly, at the time of operating the HST 7 for turning by the steering wheel 34 by way of the operation mechanism 126 for turning, it is possible to reduce the operation load of the HST 7 for turning due to the booster 129 for turning which is provided to the intermediate portion of the operation mechanism 126 for turning and hence, the HST 7 for turning can be operated with the slight operation load.

Further, even when a reverse load (a so-called kickback) acts on the operation mechanism 126 for turning due to the load applied to the HST 7 for turning, the booster 129 for turning performs the buffering function and hence, it is possible to favorably ensure the operability of the steering wheel 34.

Further, as shown in FIG. 7 and FIG. 9, at an upper portion of the center of the cylinder 133, an arm support shaft 160 which has an axis thereof directed in the left and right direction is rotatably mounted about the axis, an upper end of a piston interlocking arm 161 which is arranged in the oil accumulating portion 132 is contiguously formed with a proximal end portion of the arm support shaft 160, and a lower end portion of the piston interlocking arm 161 is engaged with a center portion of the piston 135, whereby the piston interlocking arm 161 is rotated in the fore-and-aft direction in an interlocking manner with the sliding of the piston 135 in the fore-and-aft direction.

Then, a distal end portion of the arm support shaft 160 is projected outwardly to the right side from the cylinder 133 and a lower end portion of an operation arm 162 is interlockingly connected with the distal end portion of the arm support shaft 162, and the downstream-side connecting rod 163 which forms a downstream side portion of the operation mechanism 126 for turning and constitutes an interlocking operation member is interposed between an upper end portion of the operation arm 162 and the trunnion arm 125.

The booster 130 for straight forward operation is mounted on an inner surface of the intermediate portion of the right-side body frame forming member 23 by way of the stay 131 using mounting bolts 144, wherein the booster 130 for traveling straight forward has the equal basic structure as the above-mentioned booster 129 for turning operation and is constituted such that the booster 130 assumes the left and right symmetry with respect to the booster 129 for turning operation and is mounted on the right-side vehicle frame forming member 23.

Accordingly, by setting the basic operation of the booster 130 for traveling straight forward equal to the basic operation of the booster 129 for turning operation, it is possible to smoothly operate the trunnion arm 127 of the HST 6 for traveling straight forward.

That is, at the time of operating the HST 6 for traveling straight forward using the forward/backward traveling changeover lever 40 by way of the operation mechanism 128 for straight forward traveling, the operation load of the HST 6 for straight forward traveling can be reduced due to the booster 130 for straight forward traveling which is formed on the intermediate portion of the operation mechanism 128 for straight forward traveling and hence, it is possible to operate the HST 6 for straight forward traveling with the slight operation load.

Further, even when the reverse load (the so-called kickback) acts on the operation mechanism 128 for straight forward traveling due to the load applied to the HST 6 for straight forward traveling, the booster 130 for traveling straight forward performs the buffer function and hence, it is possible to favorably ensure the operability of the forward/backward traveling changeover lever 40.

FIG. 10 shows a hydraulic circuit part B of the traveling vehicle A according the present invention. In the hydraulic circuit part B, to the tandem type charge pump P, the HST 6 for straight forward traveling, the booster 130 for traveling straight forward, the HST 7 for turning, the booster 129 for turning operation, the PTO clutch 98, the lift cylinder 177, the swing cylinder 180 and an external hydraulic takeout part 181 are connected in parallel. Symbol P1 indicates a pump for straight forward traveling, symbol M1 indicates a motor for straight forward traveling, symbol P2 indicates a pump for turning, symbol M2 indicates a motor for turning, numeral 182 indicates a flow divider, numeral 183 indicates a swing valve, numeral 184 indicates an electromagnetic proportional valve part.

INDUSTRIAL APPLICABILITY

The present invention can be exercised in the above-mentioned modes and can obtain the advantageous effects as described below.

(1) In the present invention according to claim 1, the power transmission system for traveling straight forward, the power transmission system for turning, the power transmission system for PTO and the power transmission system for driving a pump are integrally arranged in the inside of a transmission part, and the transmission device for traveling straight forward and the continuously variable transmission device for turning are interlockingly arranged in a juxtaposed state in the above-mentioned transmission part.

Due to such a constitution, it is possible to arrange the transmission systems compactly as a whole in the inside of the transmission part and at the same time, it is possible to simply assemble all transmission systems including the power transmission system for traveling straight forward, the power transmission system for turning, the power transmission system for PTO and the power transmission system for driving the pump by simply mounting the transmission part on the body frame.

Further, since the transmission device for traveling straight forward and the continuously variable transmission device for turning are interlockingly connected with the transmission part in a juxtaposed state, the operation systems of both transmission devices can be also arranged in a juxtaposed state whereby these operation systems can be arranged compactly and, at the same time, these operation systems can be surely operated.

(2) In the present invention according to claim 2, the transmission part includes the transmission front lid portion, the transmission body portion which is integrally formed with the axle case and the transmission intermediate portion which is provided between the transmission front lid portion and the transmission body portion, the power transmission system for traveling straight forward, the power transmission system for turning, the power transmission system for PTO and the power transmission system for driving the pump are integrally arranged in the inside of the above-mentioned transmission part, power which is inputted from the prime mover part through the transmission front lid portion is designed to be branched and transmitted to the power transmission system for traveling straight forward, the power transmission system for turning and the power transmission system for PTO, at the transmission intermediate portion and the transmission front lid portion, and the parking brake and the PTO clutch are arranged in the inside of the above-mentioned transmission intermediate portion.

Due to such a constitution, it is possible to compactly arrange the transmission systems as a whole in the inside of the transmission part and, at the same time, it is possible to simply assemble all transmission systems constituted of the power transmission system for traveling straight forward, the power transmission system for turning, the power transmission system for PTO and the power transmission system for driving the pump by merely mounting the transmission part on the body frame.

Here, the transmission part includes the transmission front lid portion, the transmission body portion which is integrally formed with the axel case and the transmission intermediate portion which is formed between the transmission front lid portion and the transmission body portion, wherein power which is inputted from the prime mover part through the transmission front lid portion is transmitted in a branched manner to the power transmission system for traveling straight forward, the power transmission system for turning and the power transmission system for PTO at the transmission intermediate portion and the transmission front lid portion. Accordingly, the branching of respective power transmission systems in the transmission body portion in accordance with the systems can be performed neatly and hence, a dead space in the axial direction can be reduced whereby the transmission part can be manufactured compactly.

Further, since the parking brake and the PTO clutch are arranged in the inside of the transmission intermediate portion, it is no more necessary to provide a protective cover for protecting these parking brake and PTO clutch from splashed mud, soil and the like. Further, by removing the transmission front lid portion, it is possible to easily perform the maintenance of these parts or the like.

(3) In the present invention according to claim 3, the transmission device for traveling straight forward and the continuously variable transmission device for turning are interlockingly connected with the transmission part in a juxtaposed state and charge ports of these transmission devices are communicably connected with each other through the charge oil passage formed in the inside of the wall portion of the transmission part.

Due to such a constitution, it is also possible to arrange the operation systems of both transmission devices in a juxtaposed state whereby these operation systems can be arranged compactly and, at the same time, these operation systems can be surely operated.

Further, the charge ports of these transmission devices are communicably connected with each other through the charge oil passage formed in the inside of the wall portion of the transmission part and hence, the oil supply piping can be reduced as much as possible and, at the same time, the oil supply passages can be arranged in a concentrated manner.

(4) In the present invention according to claim 4, the continuously variable transmission device for turning and the transmission device for traveling straight forward are interlockingly connected with the transmission part, the steering wheel is interlockingly connected with the continuously variable transmission device for turning by way of the operation mechanism for turning, while a forward/backward traveling changeover lever is interlockingly connected with the above-mentioned transmission device for traveling straight forward by way of the operation mechanism for traveling straight forward, a booster for turning operation is mounted on the intermediate portion of the above-mentioned operation mechanism for turning, and the booster for traveling straight forward is mounted on the intermediate portion of the operation mechanism for traveling straight forward.

Due to such a constitution, at the time of operating the continuously variable transmission device for turning using the steering wheel by way of the operation mechanism for turning, due to the provision of the booster for turning which is provided to the intermediate portion of the operation mechanism for turning, the operation load of the continuously variable transmission device for turning can be reduced and hence, it is possible to operate the continuously variable transmission device for turning with the slight operation load.

Further, even when the reverse load (so-called kickback) acts on the operation mechanism for turning due to the load to the continuously variable transmission device for turning, the booster for turning performs the buffer function and hence, it is possible to favorably ensure the operability of the steering wheel.

Further, at the time of operating the transmission device for traveling straight forward using the forward/backward traveling changeover lever by way of the operation mechanism for traveling straight forward, due to the provision of the booster for traveling straight forward which is provided to the intermediate portion of the operation mechanism for traveling straight forward, it is possible to reduce the operation load of the transmission device for traveling straight forward whereby it is possible to operate the transmission device for traveling straight forward with the slight operation load.

Further, even when the reverse load (so-called kickback) acts on the operation mechanism for traveling straight forward due to the load to the transmission device for traveling straight forward, the booster for traveling straight forward performs the buffer function and hence, it is possible to favorably ensure the operability of the fore-and-aft changeover lever.

(5) In the present invention according to claim 5, the booster for turning operation, the interlocking operation member of the booster for turning operation, the booster for traveling straight forward, and the interlocking operation member of the booster for traveling straight forward are arranged along positions in the vicinity of lefts-side and right-side body frame forming members which are arranged such that these members extend in the fore-and-aft direction.

Due to such a constitution, when the respective boosters are operated, it is possible to prevent a phenomenon that the respective interlocking operation members interfere with other installed objects and give rise to erroneous operations, at the same time, it is possible to protect outer side portions of the respective boosters from splashed mud, soil and the like due to the left and right-side body frame.

Further, the respective boosters adopt the hydraulic actuation method and the working oil is supplied to the respective boosters by way of the booster supply oil passages which are formed by branching from the charge oil passages leading to the above-mentioned transmission devices.

Due to such a constitution, it is possible to make the booster supply oil passage as short as possible and, at the same time, it is possible to surely supply the working oil to the respective boosters from the charge oil passages of the transmission device through the booster supply oil passages whereby the function of the respective boosters can be favorably ensured.

The invention claimed is:

1. A traveling vehicle comprising
a body frame interposed between a pair of left and right traveling parts and, mounted on the body frame, a prime mover part and a transmission part which is interlockingly connected with the prime mover part,
a power transmission system for traveling straight forward, a power transmission system for turning, a power transmission system for PTO and a power transmission system for driving a pump, said power transmission systems being integrally arranged in the inside of the transmission part, and
a transmission device for traveling straight forward and a continuously variable transmission device for turning, said transmission device being interlockingly arranged in a juxtaposed state in the transmission part.

2. A traveling vehicle comprising
a body frame interposed between a pair of left and right traveling parts and mounted on the body frame, a prime mover part and a transmission part which is interlockingly connected with the prime mover part,
the transmission part including a transmission front lid portion, a transmission body portion which is integrally formed with an axle case and a transmission intermediate portion which is provided between the transmission front lid portion and the transmission body portion,
a power transmission system for traveling straight forward, a power transmission system for turning, a power transmission system for PTO and a power transmission system for driving a pump, said power transmission systems being integrally arranged in the inside of the transmission part,
wherein power which is inputted from the prime mover part through the transmission front lid portion is branched and transmitted to the power transmission system for traveling straight forward, the power transmission system for turning and the power transmission system for PTO at the transmission intermediate portion and the transmission front lid portion, and
a parking brake and a PTO clutch are arranged in the inside of the transmission intermediate portion.

3. A traveling vehicle comprising
a body frame interposed between a pair of left and right traveling parts and mounted on the body frame, a prime mover part and a transmission part which is interlockingly connected with the prime mover part, a transmission device for traveling straight forward and a continuously variable transmission device for turning, said transmission devices being interlockingly connected with the transmission part in a juxtaposed state, and charge ports of the transmission devices communicably connected with each other through a charge oil passage formed in the inside of a wall portion of the transmission part.

4. A traveling vehicle comprising a continuously variable transmission device for turning and a transmission device for traveling straight forward, said transmission devices being interlockingly connected with a transmission part, a steering wheel is interlockingly connected with the continuously variable transmission device for turning by way of an operation mechanism for turning, a forward/backward traveling changeover lever interlockingly connected with the transmission device for traveling straight forward by way of an operation mechanism for traveling straight forward, and a booster for turning operation mounted on an intermediate portion of the operation mechanism for turning, and a booster for traveling straight forward mounted on an intermediate portion of the operation mechanism for traveling straight forward.

5. A traveling vehicle according to claim 4, wherein the booster for turning operation, an interlocking operation member of the booster for turning operation', the booster for traveling straight forward, and an interlocking operation member of the booster for traveling straight forward are arranged along positions in the vicinity of left-side and right-side body frame forming members which are arranged such that the members extend in the fore-and-aft direction, and the respective boosters adopt a hydraulic actuation method and a working oil is supplied to the respective boosters by way of booster supply oil passages which are formed by branching from charge oil passages leading to the transmission devices.

* * * * *